Oct. 9, 1951 O. H. SCHADE 2,570,723

TELEVISION SYSTEM

Filed Nov. 21, 1946 2 Sheets-Sheet 1

INVENTOR
OTTO H. SCHADE
BY W. S. Grover
ATTORNEY

Oct. 9, 1951 O. H. SCHADE 2,570,723

TELEVISION SYSTEM

Filed Nov. 21, 1946 2 Sheets-Sheet 2

INVENTOR
OTTO H. SCHADE
BY W. S. Grover
ATTORNEY

Patented Oct. 9, 1951 2,570,723

UNITED STATES PATENT OFFICE 2,570,723

TELEVISION SYSTEM

Otto H. Schade, West Caldwell, N. J., assignor to Radio Corporation of America, a corporation of Delaware Application November 21, 1946, Serial No. 711,235

15 Claims. (Cl. 178—5.2)

The present invention relates to television, and, more particularly, to the method of and means for operating a television transmitter so that color television signals may be so generated and transmitted that, when received, there will result the production of color television images of high fidelity and of a high order of color purity.

In color television transmitting systems of the sequential type, television signals representative of the various color components of the subject matter are sequentially transmitted. When these signals are received at the television receiver and images are reproduced on the receiver image tube, colored images will be observed when the produced images at the receiver tube are viewed through an appropriate light filter arrangement. It is common practice, at present, in color television, to employ tricolor sequential operation where the three primary colors or components are chosen as red, blue and green. Television signals representative of these individual color components are sequentially transmitted and the switching rate between the three colors is generally chosen at a frequency such that a minimum, or substantially negligible amount of flicker will be produced at the receiver. In color television systems, it is generally customary to scan each successive field in a different color so that the color switching rate corresponds to the field frequency and it is also common practice to utilize the black and white technique of double interlacing which, as is well known to those skilled in the art, is a 2 to 1 interlace method.

In color television systems, a television pick-up or camera tube of the storage type such as the iconoscope, the orthicon or the image orthicon, is generally employed with a filter assembly positioned in the optical light path of the pick-up tube to cause the photo-cathode or light responsive surface of the tube to be sequentially subjected to images projected through red, blue and green filters. This successive projection of differently colored light images onto the light responsive electrode of the television pick-up tube causes corresponding charge images to be built up within the tube and when these charge images are scanned by the cathode ray beam generated within the tube, television signals corresponding to the intensity of the charge image are produced. In order that the charge image may develop or accumulate to a maximum extent pursuant to the intensity of the light available or provided, it has generally been the practice to permit light to be projected upon each particular portion of the light responsive electrode for a maximum length of time between successive scanning operations and to then scan the resulting charge image by the cathode ray beam developed in the television pick-up tube thereby to produce video signals corresponding to the intensity of light of the particular color. In order that the television pick-up tube will have a maximum length of time within which to develop a charge image, the scanning operation of the cathode ray beam has heretofore been so controlled with respect to the color filter assembly that the position of the scanning cathode ray beam coincides with the line of demarcation between successive filter elements of the color filter assembly used at the transmitter. Furthermore, this particular phase relationship between the scanning cathode ray beam and color filter assembly, namely, maintaining the beam spot position coincident with the line of demarcation between filters or in the region between successive filter segments of the color filter assembly at the pick-up tube, has been proposed by the prior art in order that the light responsive electrode of the television pick-up tube will be exposed to light of only one color for the field cycle immediately preceding each scanning operation. New charge images will then be produced, between each successive scanning operation, that represent the light intensity of one color component only.

Generally, the filter assembly (which may, for example, be made in the form of a disc, a drum or a truncated cone) is provided with a plurality of filter elements (normally red, blue and green) and between these filter elements is generally provided a spoke or light opaque member serving the purposes of supporting the individual filter elements and of producing an optical shadow of a predetermined vertical width extending horizontally across the light responsive electrode of the pick-up tube. As explained above, it has been customary, especially with pick-up tubes exhibiting full storage characteristics, to so phase the rotation of the color filter assembly with respect to the vertical deflection of the scanning cathode ray beam that the progression of the shadows of the spokes across the light responsive electrode corresponds in position and occurs simultaneous with the progression of the scanning cathode ray beam across the target electrode so that scanning operation takes place at all times in the shadow of the spoke or opaque member between adjacent filter elements. With this phase relationship the light responsive electrodes will have been exposed to only one color component prior to each scanning operation with the result that a minimum of color contamination or color carry-over will result as a function of the phase relationship of the color filter assembly with respect to the scanning operation. Such a scanning operation and phase relationship is shown and described, for example, in my Patents No. 2,413,075, issued December 24, 1946, and No. 2,458,649, issued January 11, 1949.

When the color filter assembly is phased with respect to the scanning cathode ray beam as indicated above, such that the scanning operation takes place "in the shadow of the spoke" a minimum amount of color carry-over or color contamination will result from the standpoint of color of light to which the transmitting tube is subjected between successive scanning operations however, it has been found that a certain amount of color contamination or lack of color fidelity still remains by reason of the storage characteristics of the television pick-up or camera tube. Color contamination or lack of color fidelity may, therefore, result from one or another of two general effects, namely; (1) by reason of improper phase relationship of the color filter assembly with respect to the scanning operation, and (2) by reason of the storage characteristics of the storage type television pick-up tube.

To illustrate the first type of color carry-over or lack of color fidelity, if, in a pick-up tube operating at 100 per cent storage, the phase relationship of the filter assembly and the scanning cathode ray beam should be such that the scanning operation occurs slightly in advance of the spoke or point of junction of two adjacent filters then color purity cannot be maintained. For example, let it be assumed that the color sequence is red, blue and green and that the scanning operation takes place near the trailing edge of the red filter but ahead of or preceding the spoke or junction of the red and the next succeeding blue filter. Signals will be produced which correspond to the red color component but after the scanning operation some light will still be permitted to reach the light responsive electrode through the remaining or trailing portion of the red filter. This red light will produce a corresponding charge on the target electrode of the television pick-up tube. As the filter assembly is further rotated light will then be transmitted to the light responsive electrode through the blue element of the filter assembly to produce further charges. During the scanning operation of the next succeeding field, which is presumably the "blue" field and which occurs near the trailing edge of the blue filter but ahead of or preceding the spoke or junction of the blue and the next succeeding green filter, video signals will be generated. When these signals are transmitted to the receiver and the resulting image is viewed through a blue filter element, the low intensity signals from the red portions of the image will cause these red portions or objects to have a bluish tinge as a result of their being made visible through the blue filter at the receiver due to that portion of the red filter at the transmitter that trailed or followed the scanning beam. By phasing the color filter assembly such that the light responsive electrode is exposed to light of one color only between successive light scanning operations, this type of color carry-over or lack of color fidelity may be eliminated.

In the other type of color carry-over, namely that produced as a result of the storage characteristics of the television pick-up tube, a different effect takes place. In storage pick-up tubes and especially in systems where interlaced scanning is employed, the entire electrostatic charge produced on the target electrode is not removed by a single field scanning operation. After each scanning operation, there is a certain percentage or residue of charge on the target electrode, the extent of the residue depending upon the characteristics of the tube, the capacity of the target electrode, secondary electron redistribution (in the iconoscope and image orthicon), beam spot diameter, and various other factors. This residue of charge, unless cancelled by special means or by secondary electron redistribution, when removed by the next field scanning operation, results in the production of signals at least partially representative of the preceding color component and when such signals produce a television image at the receiver and the image is viewed through a color filter of a different color, contamination or lack of color fidelity results. There have been proposals or special means to eliminate color carry-over or lack of color fidelity by reason of storage characteristics of the television pick-up tube such as are shown and described, for example, in my Patent No. 2,458,649, supra, wherein it is proposed that the scanning cathode ray beam, on its return deflection stroke, be utilized for completing the discharge of the target electrode.

Lack of color fidelity by reason of color carry-over due to the storage characteristics of television pick-up tubes causes red images to have a bluish tinge, blue images to have a green tinge and green images to have a reddish tinge. This particular contamination exists when the color sequence is red, blue, green. If the sequence is changed to red, green, blue, for instance, then the contamination still exists but in different colors. Regardless of the sequence, a lack of true color fidelity exists by reason of the storage characteristics of the pick-up or camera tube and the fact that the charge image is not completely removed by a single field scanning operation. This type of color contamination remains even though color contamination, so far as phase relationship of the filter assembly is concerned, is reduced to a minimum by having the scanning operation take place in the shadow of the spoke in the case of full storage pick-up tubes. In some present day television pick-up tubes, the amount of the residual signal or residue can be reduced by proper design and use and is not large but may amount to some 5 to 15% depending upon the amount of charge remaining within the tube after each field scanning cycle.

In describing the present invention, it will be assumed that a sequence of red, blue, green is employed. With this sequence the above referred to type of color contamination or lack of color fidelity that exists because of the pick-up tube storage characteristics, causes red objects, for example, to appear bluish. Under such conditions, if a small amount of green could be added, the small percentage of green and the undesired blue, when combined with the principal red color, would result in a small percentage of white light with the remainder a pure unadulterated red color. This blending would result in a small percentage of white light which actually would correct the chroma of the produced color images by reducing their often too vivid intensity inasmuch as the white signals of a kinescope or television receiver image tube are somewhat expanded by reason of the electron gun characteristics of the kinescope. This addition of a small white component will therefore, in effect, tend to improve the gamma and will result in an improvement in the chroma in the reproduced image especially in flesh tone values. Accordingly, if a small amount of green could be combined with the undesired small amount of blue present when red objects are observed, and similarly a small amount of red and blue combined with the undesired small amount of green and red present when blue and green objects, respectively, are observed, then the lack of color fidelity could be completely overcome with the result that color television images of a high degree of color fidelity could be produced at a receiver.

In accordance with the present invention, this result is accomplished and small percentages of different colors are combined such that the undesired color tones that are present due to charge carry-over are completely neutralized. For example, when red images appear slightly bluish due to the characteristics of a storage operated television pick-up tube, a small compensating amount of green is deliberately added so that the added greenish component will react to overcome the undesired yet present bluish component. The same is true with respect to blue objects which are inherently caused to appear greenish by reason of the storage characteristics of the television pick-up tube and a small amount of red is deliberately added to compensate for the undesired greenish tinge. Similarly, green objects inherently appear slightly reddish but when a small component of blue is deliberately added, a slightly lighter pure green color results and substantially complete color fidelity is restored.

In accordance with the present invention, the deliberate addition of the appropriate colors to compensate for the lack of color fidelity due to the charge storage characteristic of television pick-up tubes exhibiting full storage characteristics is accomplished by proper phasing of the color filter assembly at the transmitter with respect to the scanning cathode ray beam such that the scanning operation no longer occurs within the shadow of the spoke or exactly in coincidence with the line of demarcation between filter elements as was the case with systems heretofore used, but, instead, occurs slightly subsequent or following the spoke or line of demarcation. The extent to which the beam follows the spoke or line of separation between filter elements depends upon the degree of color mixing required in order to compensate for color carry-over due to storage. Accordingly, the light responsive electrode of the television pick-up tube is permitted to have projected thereon a small amount of light through a filter segment having a color different from the color through which the light responsive electrode receives its principal exposure.

It is, therefore, one purpose of the present invention to provide, in a color television transmitter in which television pick-up tubes of the full storage type are employed and in which a lack of color fidelity is present due to the storage characteristics of the pick-up tubes, an arrangement for completely eliminating such a lack of color fidelity through appropriate color mixing and blending.

Another purpose of the present invention resides in the operation of a color television transmitter wherein color contamination or lack of color fidelity as a result of the use of a full storage pick-up tube is compensated for by the addition of signals representing still a different color so that the resultant image is a more accurate representation in color of the subject matter scanned.

Still another purpose of the present invention resides in the operation of the color television transmitter whereby the inherent lack of color fidelity, due to residual charges that remain subsequent to each field scanning operation of the television pick-up tube, is completely overcome and the undesired effects of the residual charges are completely nullified.

A still further purpose of the present invention resides in the provision of means whereby the phase relationship of the color filter assembly at the transmitter as compared with the vertical deflection of the cathode ray beam in its scanning operation, are such that the scanning cathode ray beam follows, by a predetermined small amount, the line of demarcation or spoke separating adjacent filter segments.

A still further purpose of the present invention resides in the operation of a color television transmitter in such a manner that a high degree of color fidelity results and furthermore the operation of the transmitter in such a manner that the chroma of the reproduced image is materially improved.

Still another purpose of the present invention relates to the method of and means for operating a color television transmitter whereby low intensity video signals, representing a certain color and of adjustable magnitude, are produced during the field cycle immediately preceding the field in which the principal video signals for that particular color component are produced.

Various other purposes and advantages of the present invention will become more apparent to those skilled in the art fqrom the following detailed description, particularly when considered in conjunction with the drawings where like reference numbers represent like parts and wherein.

Figures 1, 2, 3, 4, 5, 6, 7:
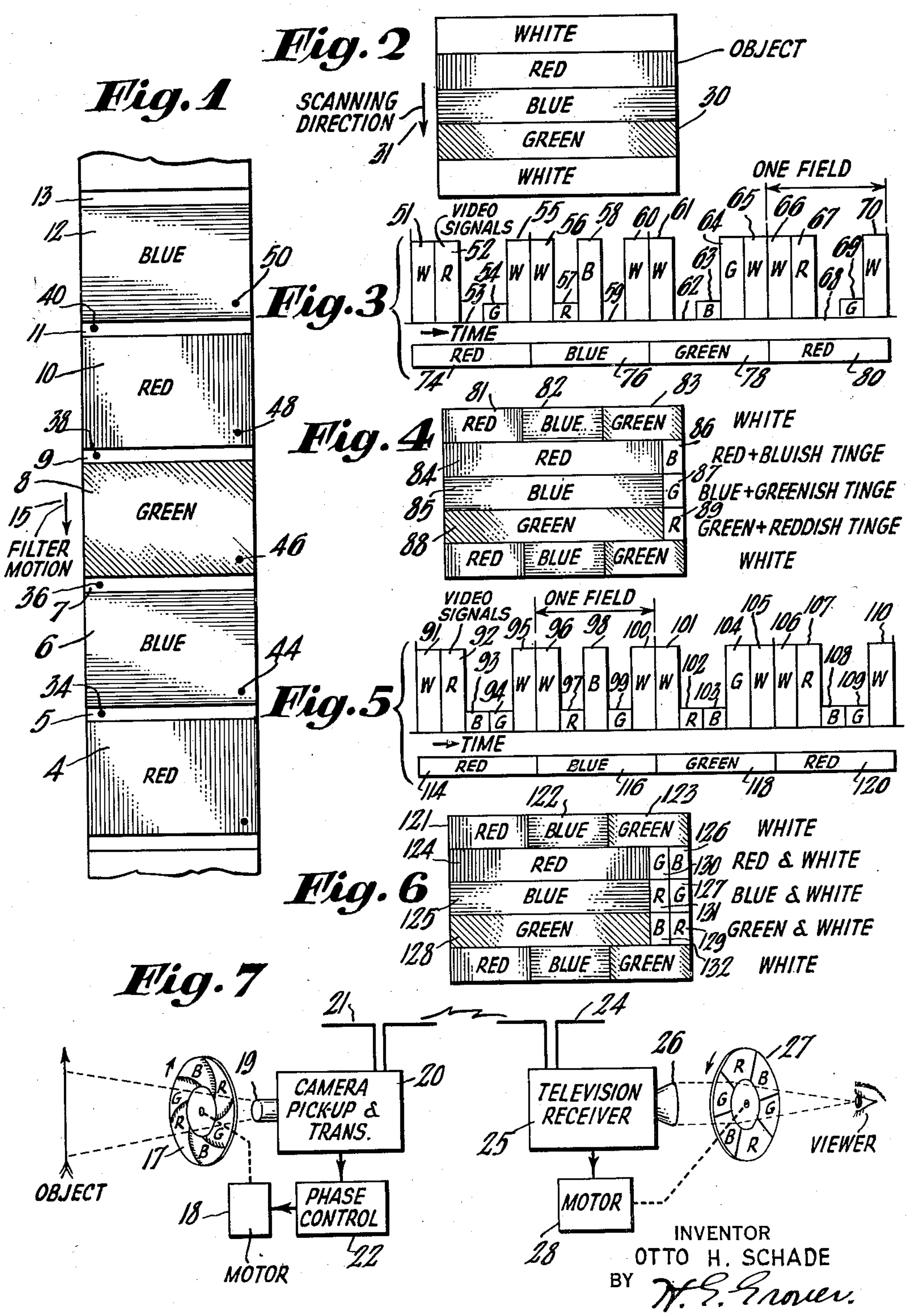
Figure 1 represents a development of a color filter assembly used in explaining the theory of operation of the present invention.
Figure 2 represents a colored object area to be scanned.
Figure 3 represents schematically the video signals produced when the object area of Figure 2 is scanned with the scanning cathode ray beam maintained at the line of separation between adjacent filter segments of color filter assembly.
Figure 4 represents schematically the colored image reproduced at a television receiver from the video signals of Figure 3.
Figure 5 represents schematically the video signals produced as a result of scanning the object area of Figure 2 in accordance with the present invention with the scanning operation occurring slightly behind or following the line of separation or demarcation between color filter segments of the color filter assembly.
Figure 6 represents schematically the colored image reproduced at a television receiver as a result of video signals shown in Figure 5.
Figure 7 shows schematically the color television transmitter and receiver; and, Figures 8 through 12 show developments of various forms of color filter assemblies that may be used in conjunction with the present invention.

Referring now to the drawings and more particularly to Figure 1 thereof, there is shown a development of a color filter assembly which for the purpose of this explanation may be considered as a disc, a drum, a truncated cone or similar unit which may be used at a television transmitter for the transmission of color television images in a sequential system. The filter assembly represented in Figure 1 shows the use of three different component-color filters, namely, red, blue and green, and for the purpose of this description, it will be assumed that these three color components are used although within the broad teachings of this invention other combinations of colors and a different number of color components may be employed where expedient. In Figure 1 the red, blue and green filters are represented at 4, 6 and 8, respectively, with red and blue repeated at 10 and 12. Actually the filter assembly may include only one set of filters or a plurality of sets may be included therein, depending upon the size of the assembly. The direction of movement of the filter is represented by the arrow 15 and with this direction of movement, the sequence or order of the colors is red, blue, green.

It is to be understood by those skilled in the art that the color filter assembly is positioned in the optical light path of the television pick-up tube or camera and in accordance with present practice, the rotational speed of the assembly is such that a different color filter is interposed in the optical axis for each successive and different television color field. Accordingly, if 120 fields per second is the vertical deflection rate of scanning in the television pick-up tube, then an appropriate color filter assembly having, for example, six filter segments (such as the illustratively suggested disc shown at 17 in Figure 7) would rotate at 1200 R. P. M. (20 revolutions per second). In Figure 7 a motor 18 is provided for rotating the disc (or drum) at the desired rate and the disc 17 is positioned in the optical light path of the lens 19 of the television camera. If a disc is employed, then it is possible that the spokes or lines of separation between filter elements may be curved as shown in Somers Patent 2,429,849, issued October 28, 1947, for example. The degree of curvature and particular shape depends upon the size of the disc and the location of the center of the disc relative to the scanned area.

In Figure 7 the television camera and all ancillary equipment, including the transmitter, are represented generally at 20 from which a modulated carier is conveyed to any desired communication channel and may be transmitted from the antenna 21 or fed out through a coaxial line or cable, where desired. A phase control device 22 is also used at the transmitter for affording a means for shifting the phase relationship of the disc 17 (or filter assembly) with respect to the vertical deflection of the cathode ray beam. Although the phase control is shown as operating on the drive motor 18 of the disc 17, it is also entirely possible to charge the phase relationship by shifting the phase of the timing pulse for the vertical deflection of the cathode ray beam to cause it to be advanced or delayed by a predetermined amount with respect to the filter disc, the rotation of which could be held constant. Alternatively, the drive motor stator may be so supported as to permit it to be rotated manually to effect the desired phase relationship. As the disc 17 is rotated in front of the television pick-up camera, television signals are generated for each field representing, in succession, the light values of the red, blue and green color components of the object area.

The transmitting signals are received by a receiving antenna 24 or other receiving medium and are supplied to a television receiver represented generally at 25. These signals when properly amplified and demodulated produce a black and white image on the end of the cathode ray tube or kinescope 26. Positioned in front of the receiving tube 26 is a rotatable color filter disc 27 which included appropriate filter segments and which is rotated at a speed such that a different filter segment is interposed in front of the receiving tube for each television field. The observer or viewer then views the produced succession of black and white images through the filter segments of the disc or filter element 27 in sequence, thereby imparting to the image by well known multi-color additive processes and principles the visual impression of full color. The disc at the receiver is driven by a motor 28 at an appropriate rate of speed and both the speed and the phase may be controlled by equipment located within the television receiver 25. The controlling factor is that the optical image upon the receiver tube 26 is to be revealed to the viewer in synchronism and appropriate phase (later to be more fully explained) with the analyzing of the object at the transmitter point into its component-color images.

Although, for simplicity, filter discs are represented at both the transmitter and receiver in Figure 7, it is to be understood that either or both of the filter discs at either the transmitter or the receiver may be replaced by appropriate drums, truncated cones or any other type of color filter assembly. Regardless of the particular type of color filter assembly employed it is desirable that the line of separation or junction of the elements be maintained substantially parallel to the line or horizontal deflection of the cathode ray beam. This is particularly true at the transmitter in exercising the present invention as will be appreciated later. Furthermore, although a radio transmission is described above, actually the transmitter and receiver may be connected by coaxial cables or other appropriate connections.

In Figure 2 of the drawings is shown an object area 30, which, for the purpose of the description of this invention will be assumed to be the colored subject matter transmitted. Through the choice of such an object the purposes and advantages of the present invention may be more readily described and understood, although naturally a television system including the present invention is adapted for the transmission of any colored object either by direct pick-up (as in a studio) or through the use of colored slides or film. The arrow 31 represents the direction in which the cathode ray beam effectively scans the object area and for the purpose of this description the direction of beam deflection in the line or horizontal direction is immaterial.

As explained above, it has heretofore been the practice, in sequential color transmissions, to so phase the color filter assembly with respect to the vertical scanning operation that the cathode ray beam scans the target area in the region of the shadow cast by the spoke between successive filters or coincident with the line of demarcation of successive or adjacent filters in order thereby to preclude, or reduce to a minimum, color carryover or contamination caused by exposing the light responsive electrode of the television full storage pick-up tube to light of more than one color between successive scanning operations. The color filter assembly of Figure 1 includes not only the filter elements per se but, to assist in the explanation of the present invention, spokes or opaque portions are included between adjacent filter elements. These spokes or opaque areas are schematically represented at 5, 7, 9, 11 and 13 in Figure 1 of the drawings.

In order that the present invention may best be understood, the undesired effects of color carryover as a result of the charge storage characteristics of television full storage pick-up tubes, and the fact that this charge, in practice, is not completely eliminated or cancelled by a single field scanning cycle, will first be described. In this description it will first be assumed that the phasing is such that the scanning operation takes place in the shadow cast by the spoke or opaque portion between adjacent filter elements (as has been the usual practice) in order that there will be no lack of color fidelity or color carryover due to the light responsive electrode of the pick-up tube being exposed to light of more than one color between successive field scanning operations. Furthermore, the object to be scanned will be that represented at Figure 2. Figure 3 shows schematically the video signals that will be generated and transmitted under these conditions. The amplitudes of the video signals represented in Figure 3 are arbitrary and are chosen primarily to assist in an explanation of the invention. When an object area such as that represented in Figure 2 is placed in front of a color television pick-up camera with which is associated a color filter assembly such as represented in the developed form of Figure 1, video signals such as represented in Figure 3 will be developed if the scanning operation takes place in the shadow of the spoke, i. e., under the shadow cast by the opaque portions between successive filter elements of the color filter assembly. For example, under this condition of phasing, the dot 34 represents the vertical position of the scanning cathode ray beam relative to the color filter assembly, and when the beam is deflected horizontally it remains under the shadow cast by the opaque portions 5 of the color filter assembly. The vertical deflection rate of the cathode ray beam across the target electrode and the rate of progression of the shadow of the spoke 5 across the light responsive electrode of the pick-up tube are substantially identical so that during one complete vertical deflection on one television field, the entire scanning operation for that field takes place in the shadow of the opaque portion 5. Elements of the target electrode will, prior to scanning, have developed an electrostatic charge corresponding in intensity to the intensity of the red component of the object area since the preceding filter of the filter assembly is red. During the scanning of the object area 30, the red filter element 4 will permit light from the top white portion to be projected onto a corresponding portion of the light responsive electrode, which in turn will produce an electrostatic charge image which, when scanned, will produce the video signals represented at 51 in Figure 3. Similarly the red portion of the object area 30 together with the red filter element 4 will have permitted the production of charges resulting in the video signals represented at 52 in Figure 3. The blue portion of the object area has not supplied any light to the light responsive electrode of the television pick-up tube through the red filter and as a result, the corresponding portion of the target electrode of the pick-up tube will contain no charge representation, for all practical purposes, so that no video signals corresponding to blue will be generated during this field as indicated at 53 in Figure 3. The green portion of the object area 30 has not supplied any light to the light responsive electrode of the pick-up tube through the red filter 4 but signals of low intensity as represented at 54 in Figure 3 will in fact be generated for a reason which was referred to above and which will be explained more fully later. Lastly the lower light portion of the object area 30 will produce video signals as represented at 55 in Figure 3.

This completes the scanning of one field, whereupon the cathode ray beam is returned rapidly in a vertical direction to begin the scanning operation of the next succeeding field. The cathode ray beam is blanked out or otherwise prevented from removing charges that are present on the target electrode during this return vertical deflection. During the next succeeding field cycle the vertical position of the scanning spot or beam with respect to the filter assembly is represented at 36 in Figure 1 and during the entire scanning operation for this field the beam, in both its horizontal and vertical deflections, remains in the shadow of the opaque portion 7 of the color filter assembly shown in Figure 1. During the scanning of the top white portion of the target area 30 color signals will be generated which are represented at 56. The next portion of the object area is red and light from this portion will not have been transmitted through the immediately preceding blue filter 6 with the result that the light responsive electrode, for all practical purposes, has not been exposed to any light over that portion corresponding to the red part of the object area. Ideally, therefore, no television signals should be generated yet actually low intensity signals are in fact generated as represented at 57 in Figure 3 during the scanning of the portion of the target electrode corresponding to the red part of the object area. The reason for the generation of these signals is based on the characteristics of storage type pick-up tubes which may have a 100% or complete storage characteristics, or the storage may be considerably less than 100% depending upon the particular design and construction of the tube. In either case, the entire charge on the target electrode caused by exposure of the red portion of the object area through the red filter 4 in the preceding field has not been removed by the single preceding field scanning operation which produced the signals represented at 52 in Figure 3. This is due to several factors, one of which may be attributed to the interlaced scanning normally employed, and the fact that inter-line charges are not so completely removed as are the line charges by the scanning operation, the size or diameter of the scanning spot, as well as other factors. Even if interlaced scanning is not employed, some residual charge will still remain in high resolution pick-up tubes because of incomplete discharge of small charges by low velocity electrons either in the discharge (or scanning) beam or by redistribution of secondary electrons. It is this residue of charge, after one field scanning cycle, that permits the production of the low intensity signals 57 on that portion of the target electrode corresponding to the red part of the target area where, in fact, no television signals should be generated if complete fidelity of color is to be obtained. Following this, the blue portion of the object area will cause video signals, represented at 58 in Figure 3, to be produced since light from the blue portion of the object 30 will have been freely transmitted through the blue filter 6 to permit the production of a charge on the target electrode. The scanning of the portion corresponding to the green part of the object 30 will result in the production of substantially no video signals as represented at 59 in Figure 3 since the light from the green portion of the object area was blocked by both the preceding red and blue filters 4 and 6. The bottom white portion will naturally result in the production of video signals as represented at 60.

During the scanning of the next television field, the vertical position of the cathode ray beam is represented at 38 and the beam in both its horizontal and vertical deflections remains in the shadow cast by the opaque portion 9 following the green filter 8 and preceding the red filter 10. During the scanning of this field, television signals will be generated corresponding to the top white portion, the green portion and the bottom white portion of the object area as represented at 61, 64 and 65, respectively in Figure 3, while low intensity signals, 63 in Figure 3, will be generated for the blue portion of the object area 30 due to incomplete cancellation of the charges produced on the target electrode during the immediately preceding field cycle. Substantially no video signals will be generated during the scanning of the red portion of the object area as indicated at 62 in Figure 3.

During the next succeeding television field, the cathode ray beam or scanning spot will be located, in phase relationship, as indicated at 40 in Figure 1 and during this field, signals will be generated as represented at 66 through 70 of Figure 3. This is, for all practical purposes, the "red" field, but, in addition, low intensity signals corresponding to the green portion of the object area will also be generated as indicated at 69, since the immediately preceding field scanned was green. It will also be observed that the signals generated during this field are identical to those generated during the scanning of the first described field with the scanning spot located as represented at 34 and with video signals 51 through 55 being generated.

In television receivers, it is, at present, the usual practice to provide a rotating or moving color filter assembly and to reproduce the image preferably in black and white on the viewing end of a kinescope or receiving tube. The filters are sequentially interposed between the observer and the produced black and white image in order to impart color to the images in sequence. For the purpose of the present invention, it will be assumed that such a construction is used and that the phasing of the disc was such that a filter segment of appropriate color will be positioned over the area rendered luminous or fluorescent by the action of the cathode ray beam. The color of the filter segment that is in position in front of the activated portion of the receiver tube screen should, of course, correspond in color to the filter segment which was used in exposing the photo-cathode of the pick-up tube just prior to the particular field scanning cycle. The present invention, however, is actually applicable to receivers wherein no disc or moving filter assembly is provided but instead wherein superimposed screens of different phosphors are used or the type receiver where separate images of different colors are produced at different areas and are combined optically.

In Figure 3 is represented kinescope viewing filters 74, 76, 78 and 80 of colors red, blue, green, red, respectively, and these filters, as will be observed, are associated individually with particular field intervals of the video signals shown in Figure 3. The red kinescope viewing filter 74 is, for example, associated with video signals 51 through 55 which are generated by scanning in the shadow of the opaque portion 5 immediately following the red filter 4. Similarly, receiver image viewing filters 76, 78, 80 of Figure 3 corresponds to similar color filters 6, 8 and 10 of the transmitter filter assembly. The video signals represented in Figure 3, when applied to a television receiving tube, produce black and white images to which are imparted colors by the filters 74 through 80 through which these images are observed in sequence. The relationship of time to the video signals and the order of the filters is represented by the arrow in Figure 3. Since the top and bottom portions of the object cause illumination on the corresponding portions of the receiving tube in each field, and are visible through each of the red, blue and green filters in succession, the optical effect is that of a reproduction of white light, since these three colors are additive and the use of proper filter numbers are chosen in accordance with the phosphors or luminescent material of the receiving tube so that substantially white light can be produced. The reproduced image, as it appears at the receiver, is shown in Figure 4 and in this figure, the composite colors are represented in a horizontal direction, all of which are uniformly applicable to the same horizontal portion of the object, as, for example, the red, blue and green portions, which additively cause the top portion of the viewed image to appear white, are represented at 81, 82 and 83. A similar situation exists with respect to the bottom white portion of the object.

The red portion of the object area 30 was effective to produce normal intensity video signals 52 for the field during which the scanning operation took place in the shadow of the spoke 5. This caused the corresponding portion of the screen of the receiving tube to emit white light, which, when observed through the red filter 74, caused that portion of the screen to appear red. This coloration is represented at 84 in Figure 4. It will be observed, however, that some signals were developed during the scanning of the portion of the target electrode corresponding to the red part of the object area during the next succeeding field (blue) even though no light had been projected on the corresponding portion of the pick-up tube during the immediately preceding field cycle just prior to the scanning operation in the shadow of the opaque portion 7. These signals as explained above, are represented at 57 in Figure 3. These low intensity signals cause a small amount of white light to be emitted from that portion of the receiving tube corresponding to the red part of the object but during this field cycle interval, the object is seen through the blue filter 76 in order that the blue portion of the object will be seen as blue as represented at 85 in Figure 4. The observation of the small amount of light from that portion of the receiving tube corresponding to the red portion of the object through the blue filter results in the red portion assuming, in addition, a bluish tinge and this bluish tinge is represented at 86 in Figure 4. The image produced and seen by the observer at the receiver, therefore, rather than appearing a pure red, as in the object, is, in fact, red plus a small percentage of blue due to the residual signal 57 producing light which is visible through the blue filter.

A similar effect takes place insofar as the blue portion of the object is concerned. Its principal coloration is due to the signals 58 and their effect being observed through the blue filter 76. The low intensity signals 63 generated in the next field cycle cause low intensity light to be emitted over that portion of the receiving tube corresponding to blue, but at that time, a green filter is in front of the receiving tube with the result that a small or low intensity green coloration 87, in Figure 4, is added to that portion of the receiving tube corresponding to blue in the object area with the result that blue objects are given a greenish tinge. By similar action, green objects, when viewed at the receiver, appear principally green as indicated at 88 in Figure 4, with a small component of red as represented at 89.

Accordingly, it will be seen that, even though the color filter assembly is so phased as to preclude any color contamination due to exposure to more than one color between successive scanning cycles, and even though the light responsive electrode of the television full storage pick-up tube is subjected to light of one color only between successive field scanning cycles, complete color fidelity reproduction is impossible by reason of the retention of the charge in the television pick-up tube from one field into the next succeeding field. If the color sequence is red, blue, green, as is assumed in the above description, then red objects have a slightly bluish tinge, blue objects a slight greenish tinge and green objects a slight reddish tinge. A reversal of the color sequence to red, green, blue naturally does not eliminate the effect but merely alters the type of color infidelity by making red objects appear greenish, green objects appear bluish and blue objects appear reddish.

Accordingly, in the present invention, this color contamination or lack of color fidelity is, in effect, eliminated by compensating color blending through the deliberate introduction of still a third color with the result that complete color fidelity is restored and a desirable small white component is added. For example, as explained above, red objects appear with a slight bluish tinge which is particularly objectionable in the reproduction of flesh or facial tones, but if a small and proper percentage of green can be added to the bluish red, the result is red with a small component of white. It may appear that this would result in a "washing out" of all colors and a dilution of tones, but, in practice, it has been found that such is not the case, but instead, the chroma is, in fact, improved and the hue made more natural. One objection to color television has been that the colors are unnaturally vivid and with the present invention not only is color fidelity completely restored, but tone values and hue are materially improved. Accentuation of heavy or bright colors has been caused by reason of the characteristics of the receiver tube and its tendency to over-emphasize highlights and accordingly bright colors. The present invention tends to reduce this effect while at the same time materially improving the fidelity of color as seen at the receiver.

To now describe the present invention, reference is made again to Figures 1 and 5. In the latter figure are shown four successive field cycles and the television video signals generated during these four cycles. The object area scanned is the same object as described above in connection with Figure 3 and as shown in Figure 2. The fields scanned will likewise be the same.

In accordance with the present invention, it will be assumed that the position of the cathode ray beam is as indicated at 44 which is slightly delayed in position with respect to the opaque portion 5, or line of separation, between the red and blue filters 4 and 6 respectively. Naturally the cathode ray beam is deflected in a horizontal or line direction during the scanning operation but the relative position of the beam and the opaque portion is maintained throughout the scanning cycle. The scanning spot remains at substantially this predetermined distance trailing or following the opaque portion 5 throughout the complete field scanning cycle as the scanning cathode ray beam is deflected horizontally and vertically. If the scanning operation is performed with this phase relationship between the color filter assembly and the scanning cathode ray beam, then video signals corresponding to 91 through 95 in Figure 5 will be generated. Signals 91 and 95 will naturally be generated corresponding to the top and bottom white portions of the object area 30 since white light from both these areas permits the transmission of light components through any filter element of the filter assembly. Video signals represented at 92 will be generated corresponding to the red portion of the object area since light from this red portion will have been transmitted through the filter element 4 to produce an electrostatic charge image on the corresponding portion of the target electrode. During the scanning of that part of the target electrode corresponding to the blue portion of the object area 30 low intensity video signals 93 will be generated due to, and in proportion to, the short exposure of the light responsive electrode to light from that part of the object area through the small portion of the blue filter 6 between the opaque element 5 and the position 44 of the cathode ray beam. Since the scanning cathode ray beam follows or trails the opaque portion 5, and since this trailing occurs within the blue filter element 6, a small charge will be produced on that portion of the target electrode corresponding to the blue part of the object area, resulting in the video signals 93. During the scanning of that portion of the target electrode corresponding to the green part of the object area, low intensity signals 94 will be generated due to the characteristics of the television pick-up tube and incomplete discharge by one field scanning cycle, as explained above. After the field cycle has been completed, the cathode ray beam is then returned in a vertical direction to begin a subsequent field cycle, during which scanning operation or cycle the cathode ray beam will occupy a position relative to the spoke 7 as indicated at 46 in Figure 1. During this field cycle, video signals 96 will be generated corresponding to the top white part of the object area. During the scanning of that portion of the target electrode corresponding to the red part of the object area low intensity signals will be generated since the previously produced electrostatic charge image will not have been completely removed by the action of the scanning beam or by secondary electron redistribution in the immediately preceding field cycle. These low intensity video signals are represented at 97, When that portion of the target electrode corresponding to the blue part of the object area is scanned, video signals 98 will be generated since light will have been freely transmitted from that part of the object through the blue filter 6 to produce corresponding electrostatic charges. During the scanning of the portion of the target electrode corresponding to the green part of the target electrode low intensity video signals as represented at 99 will be generated by reason of the short exposure of the light responsive electrode to light from the green part of the object area through the small portion of the green filter 8 which precedes, in point of time, the relative vertical position of the scanning cathode ray beam as indicated at 46. Finally, in this particular field, video signals 100 will be generated during the scanning of that portion of the target electrode that corresponds to the bottom white portion of the object area 30.

During the next field cycle, the relative vertical position of the scanning cathode ray beam throughout each line will be that indicated at 48 in Figure 1, which position is located slightly following the opaque portion 9 separating the green filter 8 and the red filter 10. During this field cycle video signals 101 through 105 will be generated corresponding to the various parts of the object area 30. With the scanning beam at the vertical position indicated at 48, and with this phase relationship, video signals represented at 101, 104, and 105 will be generated corresponding respectively to the top white, the green and the bottom white portions of the object area. The low intensity video signals 103, corresponding to the blue portion of the object area will be generated due to charge carryover in the pick-up tube (similar to signals 63 in Figure 3). The low intensity signals 102, corresponding to the red portion of the object area will be generated by reason of the phase relationship of the filter assembly with respect to the scanning beam and the fact that a small part of the red filter 10 precedes the beam when the latter is in position 48.

Similarly, during each line deflection of the next succeeding field cycle, with the scanning cathode ray beam located relative to the spoke 11 as indicated at 50 in Figure 1, video signals corresponding, for example, to 106 through 110 of Figure 5 will be generated. These are a repetition of video signals 91 through 95 since in each field the scanning operation trails the line of demarcation between a red and a blue filter element.

Associated with the video signals shown in Figure 5 are kinescope viewing filters 114, 116, 118 and 120 which are the red, blue, green and red filter elements of the receiver color filter assembly 27. These correspond to the red, blue, green and red filter elements 4, 6, 8 and 10 of the transmitter filter assembly of Figure 1 (or as shown at 17 in Figure 7). When the video signals 91 through 95 produce a black and white image on the television receiving tube, and when this image is viewed through the red filter segment 114, lighted portion of the receiver tube will appear red as indicated in Figure 6 of the drawings. The red component of the top white portion of the object is indicated at 121 while the red part of the object is indicated at 124 in Figure 6 as seen through the red filter 114. The blue portion of the object area will appear through the red filter 114 to have a slight reddish tone due to the low intensity video signals 93 produced as a result of the trailing of the cathode ray beam behind the line of separation between the red and blue filters 4 and 6, respectively, since the scanning operation is performed within the beginning portion of the blue filter 6. This low intensity reddish tone is indicated at 131 in Figure 6. The green portion of the object area will also appear in a low intensity red by reason of the video signals 94 which are generated by reason of incomplete discharge of the target electrode during the immediately preceding field scanning cycle. This faint reddish tone appearing in the green portion of the object is represented at 129 in Figure 6.

During the next field cycle, the video signals 96 through 100 will produce light which is visible through the blue filter 116. The blue component of the top white part of the object is represented at 122 in Figure 6. Due to the video signals 97, the red portion of the object area will supply a small amount of light which will cause this portion of the object to appear faintly blue as indicated at 126 in Figure 6 due to the color carry-over by reason of the incomplete discharge of the corresponding part of the target electrode of the pick-up tube in the preceding field scansion interval. The video signals 98 corresponding to blue in the object area will cause the blue part of the received image to appear quite blue through the filter 116 as represented at 125 in Figure 6. The green part of the object area will appear at the receiver in a faint bluish tone represented at 132 in Figure 6 due to the low intensity video signals 99 generated by reason of the trailing position 46 of the cathode ray beam with respect to the opaque portion 7 of the color filter assembly represented in Figure 1. In the next (or green) field cycle, video signals 101 through 105 will produce light at the receiver tube and the green component of the top white part of the object area is represented at 123 of Figure 6. Both the red and blue portions of the object area will appear slightly greenish due to video signals 102 and 103 respectively and due to the light generated by these signals being observed through the green filter 118. These portions are represented in Figure 6 at 130 and 127, respectively. The green portion of the object area will be reproduced at the receiver and will appear predominately green as in 128 in Figure 6 due to the video signals 104 and the observation of the light produced thereby through the green filter 118. The next field cycle (red) shown in Figure 5 will produce results similar to those described above in connection with the first field cycle (red).

From the above, it may be seen that the top (and the bottom, as well) white portion of the object area will appear white due to optical blending of the red, blue and green colors 121, 122 and 123 respectively of Figure 6. The red portion of the object area, rather than appearing with a bluish tone as in Figure 4, will be a proper red color since the bluish tinge present in Figure 4 will be eliminated by the deliberate addition of a green tinge corresponding to 130 in Figure 6. The faint bluish tinge 126 of Figure 6 (which corresponds to the faint blue tinge 86 in Figure 4) when combined with the deliberately added greenish tinge 130 together with a slight amount of red, result in the optical effect of a pure red, plus a small component of white. The small component of white is not sufficient to cause the red area to appear "washed out" or pale due to the characteristics of the receiver tube and its inherent tendency to increase color contrast in the high light intensity regions.

In Figure 6, the undesired color tones or tinges 126, 127 and 129 correspond to the undesired color tones 86, 87 and 89 of Figure 4 while the deliberately added color tinges in Figure 6 are represented at 130, 131 and 132.

In the blue portion of the object area at the receiver, the greenish tinge 127, due to pick-up or camera tube characteristics, when combined with the reddish tinge 131 which is deliberately added by the phase relationship of the color filter assembly with respect to the scanning operation, in combination with a small amount of the blue 125, results in the production of a proper blue color with a small white component. A similar combination and result occurs in the green portion of the object area with the effect that a proper green color is produced with a small component of white.

By this arrangement, it may, therefore, be seen that proper colors of red, blue and green may be produced at a television receiver, even when tubes operating on a storage principle are used and even though each field scanning cycle in such tubes does not completely discharge the target electrode, by phasing the color filter assembly such that the scanning operation takes place in the initial portion of the next succeeding color filter segment of the assembly at the transmitter, i. e., when the scanning operation occurs a predetermined distance following the line of demarcation between adjacent filter segments.

Although an object area is shown which includes white, red, blue and green, it is to be understood that the present invention, both in theory and practice, is equally applicable to any other color or combination of colors or tones. If the pure colors red, blue and green can be reproduced with proper fidelity, then virtually any other color or tone can be reproduced with equal fidelity, with intelligent choice of filters and filter numbers.

In Figure 1, opaque portions 5, 7, 9 and 11 are shown separating the various segments of the color filter assembly. These opaque portions or "spokes" were shown in this figure in order to assist in the explanation of the theory of operation of the present invention by comparing the results obtained in accordance with the present invention with the results obtained when the scanning operation occurs exactly between color filter elements, that is, when the scanning operation is so performed that light of only one color is permitted to fall upon the light responsive electrode between successive scanning operations. In accordance with the present invention, actually light of two different colors is permitted to fall upon the light responsive electrode of the pick-up tube between successive scanning operations since the filter assembly is so phased that a short exposure of the next succeeding color takes place prior to the actual scanning operation. Actually, in carrying out the present invention, the opaque portions 5, 7, 9 and 11 are unnecessary from an operational standpoint, but, if desired, they may be included from a constructional standpoint, since generally some rigid physical means is necessary to support the individual filters as, for example, the spokes of the color filter disc or drum. If the disc or drum is made of Lucite or some other transparent material with the filter segments cemented or otherwise attached thereto or imbedded therein then, in fact, no portion of the effective part of the color filter assembly need be made opaque and the individual adjacent filter segments may be abutted immediately against each other.

As indicated above, the amount of color carryover or contamination due to charge carryover within suitably designed television pick-up tubes of the storage type is not excessive and may vary in the range of from 5 to 15%. Although the percentage of color carryover may seem trivial, due to the sensitivity of the eye to departures from color purity, the bluish tinge, for example, that is imparted into red objects is quite noticeable and, in fact, renders the reproduction of pleasing and natural flesh tones difficult. If the color sequence is changed to red, green, blue then flesh tones become greenish rather than bluish and neither effect is particularly desirable.

In view of the fact that the percentage of color carryover is, in fact, low, only a small percentage of color need be injected for compensation to restore complete color fidelity. Since restoration of color fidelity can be accomplished through the introduction of proper tones in small percentages, the phase adjustments of the color filter assembly at the transmitter becomes somewhat critical. For example, if only a 5% lag of the scanning cathode ray beam at position 48 (i. e., 5% of the red filter 10) is sufficient to compensate for the greenish tinge that is imparted into blue objects, then naturally, the phase relationship of the filter assembly at the transmitter with respect to the cathode ray beam becomes somewhat critical in order that just the proper percentage of compensating color may be added to effect the desired results.

Figures 8, 9, 10, 11, 12:
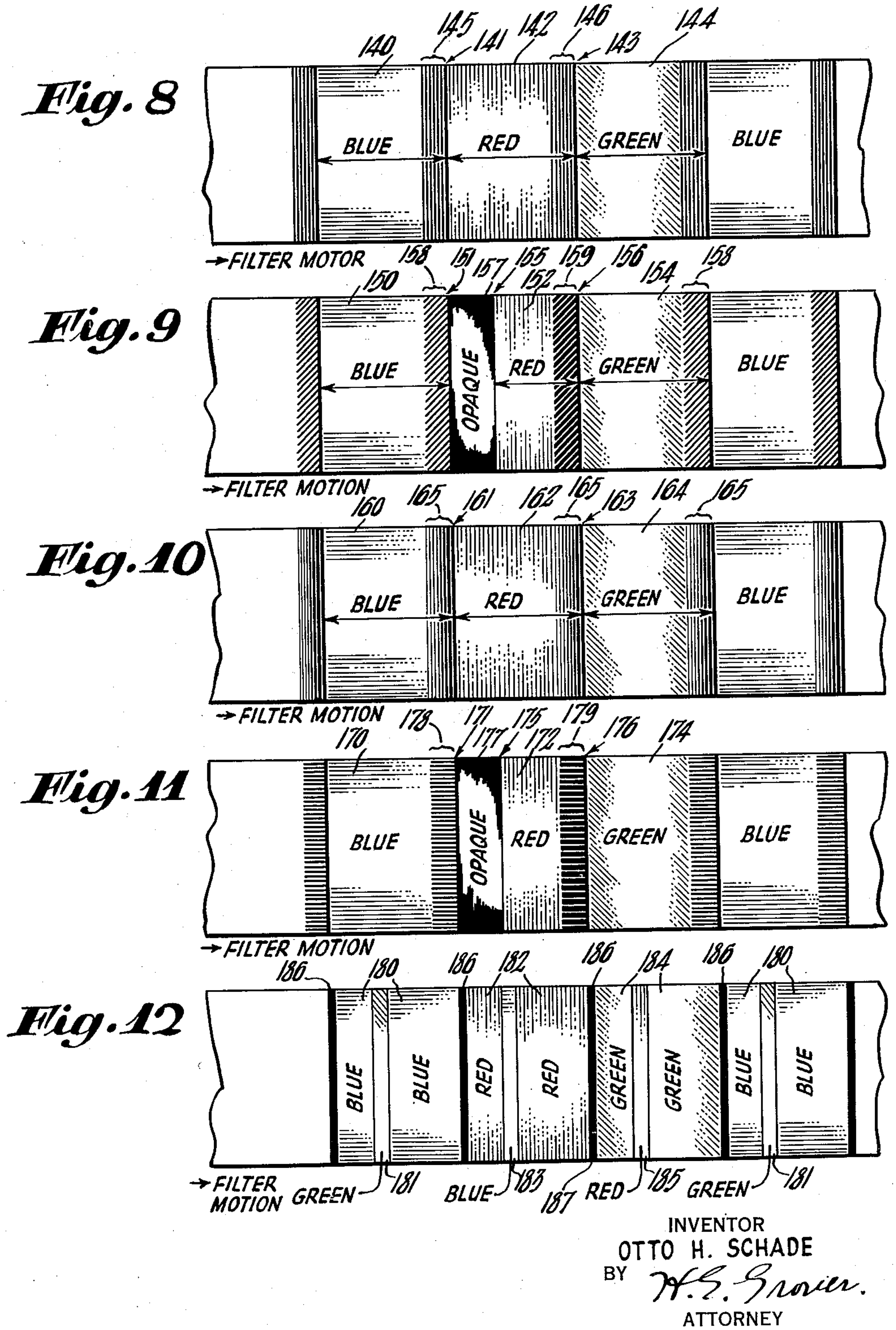

In order to render the phase adjustment of the scanning filter assembly less critical, several suggestions are shown by way of example in Figures 8 through 12, which represent developments of filter drums or discs that may be used at the transmitter. In each of Figures 8 through 11, no opaque portion or spoke (corresponding to the usual spoke) is provided between adjacent filter elements since, as explained above, no such provision is necessary. If, in actual practice, a spoke is required for mechanical reasons, the presence of the spoke, even if opaque, does not interfere with the exercise of the present invention. In order to render the phase adjustment less critical, the region in the leading portion of each filter segment may be altered. The direction of filter motion of the filters represented in each of Figures 8 through 12 is represented by an arrow associated with each figure. In Figure 8, for example, blue, red and green filter segments 140, 142 and 144, respectively, are shown with the junction of the blue and red filters at point 141, and the junction of the red filter 142 and the green filter 144 at the point 143. The remainder of the drum or disc is constructed in a similar fashion. The leading portion of each filter segment is provided with a plurality of fine or thin parallel adjacent opaque lines that extend parallel to the junction of the filters. These parallel opaque lines occupy the region marked 145 in the blue filter 140 and may extend over approximately 20% of the leading portion of that filter. The ratio of the widths of the opaque lines in region 145 to the intervening portions of the blue filter 140 may be any preferred ratio such as 1:1 or 2:1 but the ratio should be so chosen as to render the phase adjustment sufficiently non-critical as to make the phase control readily adjustable. Within the region 145, it is understood that the parallel portions between the thin opaque lines is of blue filter material similar to the blue filter 140 and preferably a part thereof with the opaque lines drawn or otherwise applied thereto. These lines may be ruled or otherwise positioned on the filter element per se, or affixed in any appropriate manner. A similar band 146 of opaque lines is located in the leading portion of the red filter 142 and a similar arrangement is provided in the leading portion of each other segment of the color filter assembly. Due to reduced transparency because of the presence of the opaque lines, phase adjustment by means of the control 22 shown in Figure 7 is rendered less critical in order to obtain the desired compensation for color carryover and in order to effect the desired purity of color at the receiver.

A modified arrangement for producing the same result is shown in Figure 9 where blue, red and green filters 150, 152 and 154 are provided. The leading edge of the blue filter is represented at the point 151 whereas the trailing edge of the preceding red filter is represented at point 155. Between points 151 and 155 is an opaque region 157, the purpose of which will be explained later. The boundary between the red filter 152 and the green filter 154 is represented at point 156.

In some television pick-up tubes of the storage type, the light responsive electrode is made of certain chemicals that render them particularly sensitive in the red portion of the spectrum. If, for example, the signals produced during the scanning of a red field are considerably higher in relative intensity than are the signals generated during the green or blue fields, then color balance due to non-uniformity of color response of the pick-up tube can be accomplished by reducing the amplitude of the signals generated during the scanning of the red field by reducing the exposure time. This may be accomplished by providing the opaque portion 157 between the end 155 of the red filter 152 and the leading edge 151 of the blue filter 150. By proper choice of the width (i. e., the dimension in the direction of filter motion) of the opaque portion 157 a satisfactory color balance can generally be obtained. An arrangement for accomplishing this same purpose, is shown and described, for example, in Somers Patent No. 2,429,849, issued October 28, 1947, and Somers Patent No. 2,478,598, issued August 9, 1949.

In order to render the phase adjustment less critical, regions 158 at the leading edges of each of the blue and green filters, are provided with a series of parallel diagonal opaque lines as indicated in Figure 9 and if, for example, the width of the opaque lines is made equivalent to the width of the filter portion intervening the lines, the sensitivity of the phase control is made one-half as critical. A corresponding region or portion of the leading edge of the red filter segment 152 (or segments, if more than one set of filters is employed) of the color filter assembly is similarly provided with a band or region 159 including parallel diagonal opaque lines, but, due to the fact that the television pick-up tube is considerably more responsive to wave lengths in the region of red light, the ratio of the lines or opaque portions to the filter portions is increased over the ratio used in the preceding or leading portions of the blue and green filter segments. For example, the widths of the opaque lines in the region 159 associated with the red filter may be 2 times the widths of the intervening filter portions (as compared with equality of widths in the case of the blue and green filter segments).

A further modification of a color filter assembly which may be used in the present invention and which will reduce the sensitivity of the phase control is shown in Figure 10. In this particular figure, blue, red and green filter elements 160, 162 and 164 are provided. The boundary or junction of the blue filter 160 into red filter 162 is represented at point 161 while the boundary between the red filter 162 and the green filter 164 is represented at the point 163. In the region of the leading portion of each filter element is shown a shaded area 165 which includes, in addition to the underlying filter, a light wedge having its most opaque portion adjacent the boundary between filter elements, as at points 161 and 163, and its most transparent portion parallel to these boundaries but positioned most removed therefrom. This light wedge is preferably a neutral filter which varies in transparency in the direction of rotation of the filter assembly. For example, the transparency may be most dense in that portion of the region 165 that is adjacent the junction 161 and least dense at the opposite edge of the region 165. Through the use of a light wedge of this nature, very small percentages of compensating color may be controlled with ease, since the most dense portion of the wedge would then be controlling, whereas high percentages of compensating color would require that the beam be in a more transparent portion of the light wedge.

A further arrangement is shown in Figure 11 which is effective for reducing the sensistivity of the phase control but this arrangement is useful only in color filter assemblies of the disc type or of a type where there is radial component of motion (i. e., in the line deflection direction) as the color filter assembly is rotated. The arrangement shown in Figure 11 would not be satisfactory for drum type filter assemblies where the motion is solely in the field deflection direction.

In Figure 11, blue, red and green filter elements 170, 172 and 174 are provided with the leading edge of the blue filter at point 171 and the trailing edge of the red filter at point 175. The junction or boundary between the red filter 172 and the green filter 174 is represented at the point 176. Intermediate points 171 and 175 there is an opaque portion 177. The purpose for this opaque portion is to reduce the effective size of the red filter element 172 to equalize or properly proportion the strengths or the intensities of the produced video signals for all colors, relative to each other, as was the case in connection with the opaque portion 157 shown and described in connection with Figure 9. The leading portion of all the filter elements is provided with the region in which opaque lines are provided, the lines extending to the leading edge of each particular filter element. The region 178, for example, is provided with a series of short opaque lines, as represented in Figure 11, and the same ratio of opaque line width to intervening filter width used in the area 178 may also be employed for all of the blue and green filters (unless some relative signal strength compensation is required as between these two colors). The region 179, associated with the leading edge of the red filter 172, has the same general configuration but a different ratio of line width to intervening filter width. The purpose of the different ratio is explained in connection with a similar arrangement in the area 159 of Figure 9. As stated above, the suggested modification of Figure 11 would be unfit for a drum type color filter assembly since the injection of the compensating color would take place only along vertical bands in the image and there would be no reduction in phasing sensitivity in the bands. If the scanning took place within the region of the short opaque lines, as is the preferred arrangement to render the sensitivity of phase control less critical, then color compensation and a resultant color purity would exist only over those vertical portions wherein light would be admitted through the filter portion between the parallel opaque lines.

In accordance with the present invention, color purity may be obtained, as expressed above, by the deliberate injection of a small percentage of color to compensate for the color carryover due to the storage characteristics of the tube and the incomplete discharge of the target electrode during a single field scansion interval. It is not necessary that this small percentage be injected by scanning a predetermined short distance following the line of separation or junction of the filter elements. This injection of color to bring about color purity can be accomplished in a color filter assembly wherein the scanning operation does take place at the line of separation of adjacent filter elements, or under the shadow of the spoke where an opaque boundary or spoke is provided between adjacent filters, by providing each filter element with a strip of a predetermined width and of the required color. Such an arrangement is shown in Figure 12. In Figure 12, blue, red and green filters 180, 182 and 184 are provided and if the color sequence is red, blue, green as indicated in Figure 12, then the blue filter 180 will be provided with a narrow green filter portion 181, the red filter 182 will be provided with a narrow blue filter portion 183 and the green filter 184 will be provided with a narrow red filter portion 185. To assist in explaining the operation of such a filter, opaque portions 186 or spokes are shown separating the adjacent filters. In this particular arrangement, the scanning operation may take place within the shadow of the opaque portion 186 and, with a filter assembly such as shown in Figure 12, a result will be accomplished which is identical to the results accomplished when the scanning operation takes place a predetermined distance following the junction of adjacent filter elements. For example, if the scanning for a particular field cycle falls under the shadow of the opaque portion 186 separating the red filter 182 into green filter 184 (scanning beam at point 187) then video signals will be generated corresponding to signals 101 through 105 of Figure 5 if an object such as represented in Figure 2 is scanned. The red signal 102 will result by reason of the narrow red filter 185, the blue video signal 103 will result by reason of the preceding blue filter element 180 and the residual charge present on the target electrode of the tube, while the video signal 104 (representing green) will be generated due to the exposure through the green filter 184. Such an arrangement is entirely feasible and proper selection of the widths of the compensated filter elements 181, 183, 185 can result in the achievement of proper color fidelity. Such an arrangement is not wholly desirable for the simple reason that there is provided no means for adjusting the amount of color added in order to compensate for the undesired color carryover. The extent of the color that is added for compensating purposes is determined by the widths or dimensions of the filter strips 181, 183 and 185 in the direction of filter rotation whereas, in arrangements such as are represented, for example, in Figures 8, 9, 10 and 11, any desired or required amount of color injection may be produced in order to assure the desired results by merely shifting the phase relationship of the color filter assembly with respect to the scanning operation by means of the phase control 22 of Figure 7.

In regard to Figure 12, it is not necessary that the compensating filter strips 181, 183 and 185 be located intermediate the leading and trailing edges of the filters 180, 182 and 184. They may, of course, be positioned at the trailing edges of the filters or at the leading edges. Regardless of their position, it is to be understood that they are not positioned on top of the principal filter but are separate narrow filter inserts. In the case shown in Figure 12, blue filter 180 is, in fact, composed of two parts, separated by the compensating filter strip 181.

So far as compensation of color carryover is concerned, it is theoretically immaterial where the strips 181, etc., are located so long as they precede the scanning operation in point of time. Actually, this is true only in pick-up tubes having complete or full storage characteristics as in the orthicon. In the image orthicon and in the iconoscope, where secondary electrons are generated (but may be insufficient to cause complete cancellation of the residual charge image), storage is not 100% and the strips 181, etc., of Figure 12 should be positioned at or near the trailing edge of a filter element. Rather than provide these insert strips it is, therefore, preferable to use a filter assembly such as shown in one or another of Figures 8 through 11 and to so phase the color filter assembly that the scanning operation takes place a predetermined distance following the line of demarcation between filter elements.

In Figures 8 through 11 are shown various arrangements to render the phase adjustment less critical by reducing the transmission efficiency of the leading position of each filter element. Under certain conditions, it is unnecessary to provide a series of opaque lines as in Figures 8, 9 and 11 or a light wedge as in Figure 10 to accomplish the result of producing a less critical phase adjustment. This can be alternatively accomplished by providing the color filter assembly with an opaque portion or spoke intermediate adjacent filter elements and by so positioning the assembly with respect to the optical lens system of the television pick-up device that a partial shadow or penumbra is produced. Within the region of this penumbra the phase adjustment will be less critical since the optical efficiency of the system is reduced. For optical reasons, the actual width of a complete shadow on the light responsive electrode will be less than the width of the opaque portion between adjacent filter elements and this complete shadow will be bounded on each side by a penumbra. The width of the penumbra is a function of the position of the filter assembly with respect to the lens system, the focal length of the lens and the lens diameter. By proper choice of these parameters, the extent of the penumbra on each side of the complete shadow can be regulated to cover the desired portion of the filter segments in order that the range of less critical phase adjustment is sufficient to accomplish the purpose. The scanning operation would then be carried out in the trailing penumbra, i. e., following the most complete shadow, and in the leading or initial portion of the next succeeding filter element. This penumbra or partial shadow is not uniform in intensity but is similar in effect to the use of a light wedge in which the least amount of light or lowest transmission efficiency is nearest the complete shadow, while the greatest amount of light or highest efficiency is most removed from the complete shadow. Accordingly, the phase adjustment becomes relatively less critical as smaller values of compensating color are required, thus assisting materially in the actual adjustment of the phase relationship. The penumbra produced over the trailing portion of the preceding filter element, although unavoidable, does reduce to a slight extent the overall optical efficiency of the system, but with the increased sensitivity of modern television pick-up tubes, this slight reduction in sensitivity may be readily tolerated.

Such an arrangement is particularly useful in studio set-ups where the lighting conditions are substantially uniform and under these conditions, lenses having approximately the same focal length and effective diameter are used consistently. Under such conditions, where the focal length of the lens as well as its effective diameter are not frequently altered so far as any particular camera is concerned, the use of penumbra can very readily be put into practice since the width or extent of the penumbra will remain constant, but can be altered by shifting the position of the filter assembly with respect to the lens. Naturally, if it should become necessary to stop down the lens or reduce its effective diameter, the extent of the penumbra would correspondingly be reduced.

In view of the foregoing, it is, therefore, clear that color contamination or color carryover as a result of the inherent operation of full storage type television pick-up tubes, or storage type tubes wherein a residue of the charge image is carried over from one field to the next, can be completely compensated for, and in addition, the color hue of the reproduced image can be improved, by the deliberate injection of low intensity video signals representing a second color component into each television field. This is accomplished by exposing the light responsive electrode to light of two different colors (and for different time intervals) between each successive scanning operation. This is preferably brought about by so phasing the color filter assembly with respect to the scanning operation that the position of the scanning cathode ray beam is located a predetermined short distance following the line of separation or demarcation between adjacent filter elements. If a spoke or opaque portion intervenes between adjacent filter elements, then color purity can be obtained and color carryover eliminated by scanning a predetermined distance following the shadow cast by the opaque portion intermediate adjacent filter elements.

Having now described my invention, what is desired to be secured by Letters Patent is:

1. The method of operating a color television transmitter wherein a storage type cathode ray television pick-up tube having a target electrode is provided and wherein the target electrode is not completely discharged by a single scanning operation of a cathode ray beam which comprises the steps of producing a charge on the target electrode in accordance with the light values of a particular component color of the object area, producing a further relatively small charge on the target electrode in accordance with the light values of a different particular component color of the object area between each successive scanning operation, and scanning the target area to produce video signals according to the charges so produced, thereby to compensate for the lack of incomplete discharge of the target electrode by each individual scanning operation.

2. The method of operating a trichromatic sequential color television transmitter wherein a charge storage target electrode is cyclically scanned by cathode ray beam to produce color television image signals, which comprises the steps of producing image signals representative of the light values of a predetermined different color for each successive scanning cycle, inherently producing low intensity image signals representative of the light values of the color for which image signals were produced in the immediately preceding scanning cycle due to the inability of the cathode ray beam to completely discharge the charge storage target electrode during a single scanning cycle, and deliberately producing low intensity image signals of adjustable magnitude representative of the light values of the color for which image signals will be produced in the next following scanning cycle, thereby to compensate for the color carryover effects that result from inherently produced image signals of low intensity.

3. The method of operating a trichromatic sequential color television transmitter wherein a charge storage target electrode is cyclically scanned by a cathode ray beam to produce image signals and wherein the charge on the target electrode is not completely removed by a single scanning operation, which comprises the steps of producing television image signals during each scanning cycle representative primarily of the light values of one predetermined color, inherently producing television image signals of low intensity during each scanning cycle representative of the light values of a second predetermined color, and deliberately producing television image signals of low intensity and adjustable magnitude during each scanning cycle representative of the light values of a third predetermined color, thereby to compensate for the lack of color fidelity due to color carryover resulting from the inherently produced low intensity image signals.

4. A sequential tricolor television transmitter including a television pick-up tube of the storage type wherein a cathode ray beam is developed and wherein a charge storage target electrode is provided, including a color filter assembly having arranged sequentially thereon filter elements corresponding to the selected three component colors, means for positioning the color filter assembly in the optical light path of the television pick-up tube, means for rotating the color filter assembly in synchronism with the field deflections of the developed cathode ray beam, and means for so phasing the color filter assembly that the line of separation between adjacent color filter elements of the color filter assembly precedes, in point of time, the position of the developed cathode ray beam so that the scanning operation takes place following the line of separation between the adjacent color filter elements thereby to produce, during each field scanto the scanning device with the boundaries between adjacent filter elements substantially parallel optically with the lines scanned on the storage electrode, the light passing through said individual elements as the assembly rotates to progressively change the color of light directed upon the scanning device at substantially the same speed at which the lines are scanned, and means for so phasing the color filter assembly with respect to the scanning operation that the particular line scanned on the storage electrode occurs a predetermined relatively short interval after the boundaries between adjacent filter elements has effectively passed over that part of the storage electrode where the scanning operation is being performed.

11. In a sequential tricolor television apparatus including a television pick-up tube of the storage type having a charge storage target electrode which is sequentially scanned in a plurality of substantially parallel paths to produce television video signals but wherein the charge on the target electrode is not completely removed by a single scanning operation, the color filter assembly including sequentially arranged color filter elements corresponding to selected component colors of the tricolor system, means for positioning the color filter assembly in the optical light path of the television pick-up tube, means for rotating the color filter assembly so that the lines of demarcation between adjacent component color filter elements lie substantially parallel to the lines scanned on the target electrode, means for rotating the color filter assembly in synchronism with the scanning operation of the target electrode so that the rate of progress of the line of demarcation of the color filter elements corresponds substantially to the rate of progress of the scanning operation, means for shifting the relationship of the color filter assembly and the scanning operation such that the lines of demarcation precede, by a small adjustable amount, the particular lines scanned on the target electrode whereby, in addition to the generation of video signals corresponding primarily to the light values of one particular color, video signals are generated in low intensity and in adjustable magnitude corresponding to the light values of another particular color, thereby to compensate for the lack of color fidelity resulting from color carryover due to incomplete discharge of the target electrode by a single scanning operation.

12. In a sequential tricolor television apparatus including a television pick-up tube of the storage type having a charge storage target electrode which is sequentially scanned in a plurality of substantially parallel lines repeated at a selected field frequency rate to produce television video signals but wherein at least a small portion of the charge on the target electrode is retained in the target following each single scanning operation, the color filter assembly including sequentially arranged color filter elements corresponding to the component colors of the tricolor system, means for positioning and rotating the color filter assembly relative to the pick-up tube so that the lines of demarcation between adjacent color filter elements remain substantially parallel to the lines scanned on the target electrode, means so adjusting the relationship of the color filter assembly and the scanning operation that the scanning operation effectively takes place during the exposure of that part of the pick-up tube through the initial portions of a filter element whereby, in addition to the generation of video signals corresponding primarily to the light values of one particular color, low intensity video signals are generated corresponding to the light values of another particular color, thereby to compensate for the lack of color fidelity resulting from color carryover due to incomplete discharge of the target electrode by a single scanning operation.

13. In a sequential tricolor television transmitting system including a storage type image pick-up tube having a charge storage target electrode, a component color filter assembly positioned in the optical light path of the pick-up tube for sequentially changing the color of the light projected into said tube whereby color television video signals may be generated for each scanning cycle corresponding predominately to light values of one particular component color, but wherein video signals are inherently generated in low intensity representative of a second component color due to charge carryover at the target electrode and the incomplete charge cancellation for each successive scanning cycle, and means for so phasing the color filter assembly with respect to the scanning operation that, in each scanning cycle, video signals are also generated in low intensity corresponding to the light values of the third color component whereby the effects of color contamination and color carryover due to incomplete charge cancellation are substantially nullified.

14. In a sequential tricolor television transmitting system including a storage type image pick-up tube having a charge storage target electrode, a component color filter assembly positioned in the optical light path of the pick-up tube for sequentially changing the color of the light projected into said tube to permit the production of color television video signals for each scanning cycle corresponding primarily to light values of one component color, but wherein low intensity video signals are inherently produced corresponding to light values of a second component color due to charge carryover at the target electrode from one scanning cycle into the next, and means for so phasing the color filter assembly with respect to the scanning operation that, in each scanning cycle, low intensity video signals are also produced corresponding to the light values of a third color component whereby the lack of color fidelity due to charge carryover at the target electrode is substantially overcome.

15. In a sequential tricolor television apparatus the combination which comprises an electron scanning device having a charge storage electrode; means for cyclically scanning the charge storage electrode with said scanning device in two dimensions in a plurality of substantially parallel lines, a rotatable color filter assembly having a plurality of component color filter elements of different optical characteristics corresponding to the three selected component colors into which the image is analyzed, said assembly being positioned and arranged in the path of light from the object area to the scanning device with the boundaries between adjacent filter elements substantially parallel optically with the lines scanned on the storage electrode, said light passing through said individual elements as the assembly rotates to progressively change the color of light directed upon the scanning device at substantially the same speed at which the lines are scanned, and means for exposing the scanning device to light of two different colors between successive scanning cycles, the exposure to ning cycle, low intensity color television video signals representative of the color of the next succeeding color filter element.

5. A sequential tricolor television transmitter including a television pick-up tube of the storage type wherein a cathode ray beam is produced and wherein a charge storage target electrode is provided, including a color filter assembly having sequentially arranged component color filter elements, means for rotatably positioning the color filter assembly in the optical light path of the television pick-up tube, and means for so phasing the color filter assembly with respect to the scanning beam that the line of separation between adjacent color filter elements of the color filter assembly precedes, in point of time, the position of the produced cathode ray beam so that the scanning operation takes place in the leading portion of the next succeeding color filter element thereby to produce, during each field scanning cycle, low intensity color television video signals representative of the color of the next succeeding color filter element.

6. A tricolor sequential television signal translating system comprising a television pick-up tube having a charge storage target electrode, means for successively scanning said target electrode with an electron beam in a series of parallel lines, a color filter assembly interposed in the optical light path of the television pick-up tube and between the target electrode and the object area, said color filter assembly including a plurality of filter elements corresponding to the three selected component colors in which the image is to be analyzed, means for moving said color filter assembly so that the lines of color demarcation thereof between adjacent filter elements remain substantially parallel to said lines of said series, means for so phasing the position of the color filter assembly with respect to the scanning electron beam that the color of light associated with each line is changed a predetermined adjustable interval prior to the instant that such line is scanned whereby color television image signals will be generated corresponding primarily to the light values of a predetermined color and also whereby low intensity color television image signals of adjustable intensity will be generated corresponding to the light values of another predetermined color.

7. A tricolor sequential television signal translating system comprising a television pick-up tube having a charge storage target electrode, means for cyclically scanning said target electrode with an electron beam in a series of parallel lines, a color filter assembly interposed in the optical path of the television pick-up tube, said color filter assembly including a plurality of component color filter elements, means for moving said color filter assembly so that the lines of color demarcation thereof between adjacent filter elements remain substantially parallel to said lines of said series, means for so phasing the position of the color filter assembly with respect to the scanning electron beam that the color of light associated with each line is changed a predetermined interval prior to the instant that such line is scanned, said predetermined interval being short as compared with a scanning cycle whereby color television image signals, in different relative intensities, will be generated corresponding to the light values of two predetermined colors.

8. In a sequential tricolor television transmitting apparatus which comprises an electron scanning device of the storage type having an image receiving area associated therewith, means for focussing a two dimensional light image of an object field on said image receiving area, means for scanning a charge storage target electrode associated with the image receiving area in two dimensions in a plurality of side by side lines, means for progressively changing the color aspect of the light image including a rotatable color filter assembly having a plurality of component color filter elements arranged thereon with boundaries between the individual filter elements, said assembly being positioned and arranged in the path of light rays forming said image with the boundaries between said filter elements substantially parallel optically with the scanned lines, means for rotating said color filter assembly in substantial synchronism with the low frequency scanning of the target electrode, means to so phase the color filter assembly that the boundaries between adjacent filter elements precede, in point of time, by an adjustable amount, the line being scanned as the boundaries successively traverse the image receiving area and as the scanning operation progresses across the target electrode whereby color television video signals are produced for each scanning operation corresponding to the light values of two different component colors but in which the relative magnitudes of the signals representing the two colors are considerably different depending upon the amount by which the boundary between individual filter elements precedes the line scanning operation.

9. In a sequential tricolor television transmitting apparatus which comprises an electron scanning device of the storage type having a charge storage electrode, means for scanning the charge storage target electrode in two dimensions in a plurality of substantially side by side lines, means including a rotatable color filter assembly having a plurality of component color filters arranged thereon with boundaries between the individual filter elements, said assembly being positioned and arranged so that images of the boundaries between said filter elements remain substantially parallel optically with the scanned lines, means for rotating said color filter assembly in substantial synchronism with the low frequency scanning of the target electrode, means for phasing the color filter assembly so that each boundary between adjacent filter elements is advanced, in point of time, with respect to the line being scanned, the degree of advance being a small percentage of a filter element, whereby color television video signals are produced for each scanning operation corresponding to the light values of two different colors but in which the relative magnitudes of the signals representing the two colors are considerably different depending upon the degree of advance, and means for altering the phase relationship of the filter assembly to change the degree of advance of the assembly.

10. In a sequential tricolor television apparatus the combination which comprises an electron scanning device having a charge storage electrode, means for scanning the charge storage electrode with said scanning device in two dimensions in a plurality of substantially parallel lines, a rotatable color filter assembly having a plurality of component color filter elements having different optical light transmitting characteristics, said assembly being positioned and arranged in the path of light from the object area one of the two colors being long as compared with the exposure to the other of the two colors.

OTTO H. SCHADE.

REFERENCES CITED

The following references are of record in the file of this patent:

UNITED STATES PATENTS

| Number | Name | Date |
|---|---|---|
| 1,278,211 | Raleigh | Sept. 10, 1918 |
| 2,310,337 | Anderson | Feb. 9, 1943 |
| 2,384,260 | Goldsmith | Sept. 4, 1945 |
| 2,413,075 | Schade | Dec. 24, 1946 |
| 2,416,918 | Goldsmith | Apr. 4, 1947 |
| 2,435,963 | Goldmark | Feb. 17, 1948 |

FOREIGN PATENTS

| Number | Country | Date |
|---|---|---|
| 555,213 | Great Britain | Aug. 10, 1943 |